United States Patent
Ikezawa

(10) Patent No.: US 8,810,724 B2
(45) Date of Patent: Aug. 19, 2014

(54) IMAGE-PICKUP APPARATUS

(71) Applicant: Canon Kabushiki Kaisha, Tokyo (JP)

(72) Inventor: Teruaki Ikezawa, Kawaguchi (JP)

(73) Assignee: Canon Kabushiki Kaisha (JP)

( * ) Notice: Subject to any disclaimer, the term of this patent is extended or adjusted under 35 U.S.C. 154(b) by 54 days.

(21) Appl. No.: 13/721,484

(22) Filed: Dec. 20, 2012

(65) Prior Publication Data

US 2013/0162898 A1    Jun. 27, 2013

(30) Foreign Application Priority Data

Dec. 27, 2011   (JP) .................... 2011-284729

(51) Int. Cl.
| | |
|---|---|
| *H04N 5/225* | (2006.01) |
| *H04N 9/04* | (2006.01) |
| *H04R 21/02* | (2006.01) |
| *H04R 19/04* | (2006.01) |
| *H04R 1/02* | (2006.01) |
| *G03B 17/00* | (2006.01) |
| *G03B 17/02* | (2006.01) |

(52) U.S. Cl.
USPC ........... 348/374; 348/373; 348/375; 348/376; 348/207.99; 381/361; 381/386; 396/424; 396/535; 396/541

(58) Field of Classification Search
USPC .................... 348/207.99, 373, 374, 375, 376; 381/361, 386; 396/424, 535, 541
See application file for complete search history.

(56) References Cited

U.S. PATENT DOCUMENTS

| | | | | |
|---|---|---|---|---|
| 8,190,021 | B2 * | 5/2012 | Wang et al. | .................... 396/535 |
| 2010/0110283 | A1 * | 5/2010 | Shin | .............................. 348/374 |
| 2010/0165182 | A1 * | 7/2010 | Yuan | .............................. 348/374 |

FOREIGN PATENT DOCUMENTS

| | | | | |
|---|---|---|---|---|
| JP | 2004088717 | * | 3/2004 | ............. H04N 5/225 |
| JP | 2005311844 A | | 11/2005 | |

* cited by examiner

*Primary Examiner* — Nhan T Tran
*Assistant Examiner* — Xi Wang
(74) *Attorney, Agent, or Firm* — Rossi, Kimms & McDowell, LLP

(57) ABSTRACT

An image-pickup apparatus includes a speaker, a movable barrel having a lens, a fixed barrel where a cam groove engaging with a cam pin provided on the movable barrel and configured to drive the movable barrel is formed on its inner periphery and an exterior part where the fixed barrel is attachable. A sound space is formed by concaving an outer periphery of the fixed barrel, the speaker is arranged so as to cover the sound space, an opening connected with the sound space is formed on the exterior part, and a bottom part of the sound space is located closer to an optical axis of the lens than to the bottom part of the cam groove in the fixed barrel.

5 Claims, 4 Drawing Sheets

IMAGE-PICKUP APPARATUS

BACKGROUND OF THE INVENTION

1. Field of the Invention

The present invention relates to an image-pickup apparatus which mounts a speaker.

2. Description of the Related Art

Conventionally, in many of image-pickup apparatuses, a speaker that outputs shutter tone, button operation sound, and reproduced sound of video clips taken by using an animation photography function is arranged on the back side of the image-pickup apparatus, and emits sound into the photographer side.

Recently, an image-pickup apparatus in which a touch panel is installed has appeared. The operation with the touch panel excels in GUI (Graphical User Interface) compared to the operation with a conventional physical button, can intuitively operate while seeing a screen, and can achieve various kinds of operability depending on a software. Further, by installing the touch panel, the number of physical buttons installed in the image-pickup apparatus decreases, and a composition of the image-pickup apparatus becomes a composition that only the touch panel is arranged on the back part of the image-pickup apparatus. Therefore, it is difficult to arrange the speaker on the back side of the image-pickup apparatus conventionally, and to emit the sound toward the photographer side.

At the same time, miniaturization of a product is always requested so that an image-pickup apparatus needs to improve portability. Therefore, the speaker is arranged more efficiently so as to advance further miniaturization of a product.

Japanese Patent Laid-Open No. 2005-311844 proposes to arrange the speaker in the space composed of the lens barrel unit, the flash and the optical viewfinder as a technology to efficiently arrange the speaker in the image-pickup apparatus.

However, the prior art disclosed in Japanese Patent Laid-Open No. 2005-311844 needs the space composed of the flash and the optical viewfinder, and cannot realize further miniaturization of the main body of the image-pickup apparatus because the main body of the image-pickup apparatus is miniaturized and an extra space in the image-pickup apparatus is not found.

SUMMARY OF THE INVENTION

The present invention provides an image-pickup apparatus capable of efficiently arranging a speaker regardless of presence of a flash and an optical viewfinder.

An image-pickup apparatus as one aspect of the present invention includes a speaker, a movable barrel having a lens, a fixed barrel where a cam groove engaging with a cam pin provided on the movable barrel and configured to drive the movable barrel is formed in its inner periphery and an exterior part where the fixed barrel is attachable. A sound space is formed by concaving an outer periphery of the fixed barrel, the speaker is arranged so as to cover the sound space, an opening connected with the sound space is formed on the exterior part, and a bottom part of the sound space is located closer to an optical axis of the lens than to the bottom part of the cam groove in the fixed barrel.

Further features of the present invention will become apparent from the following description of exemplary embodiments with reference to the attached drawings.

DESCRIPTION OF THE PREFERRED EMBODIMENTS

Exemplary embodiments of the present invention will hereinafter be described with reference to the accompanying drawings.

Figure 1:
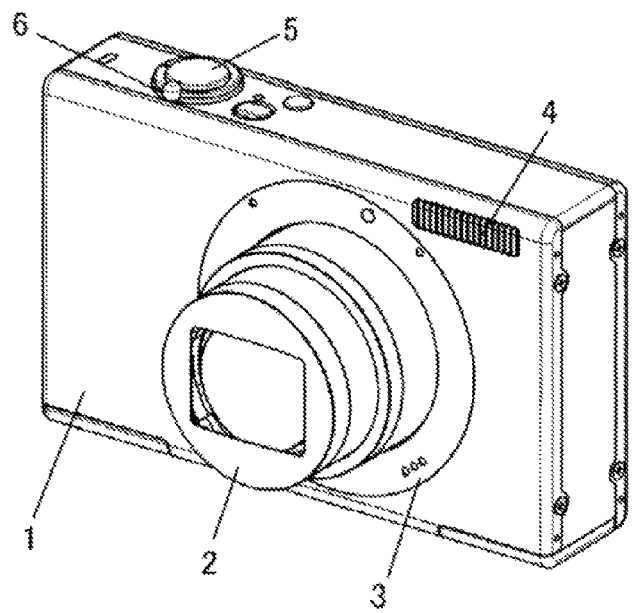
FIG. 1 is a perspective view seen from a front side of a digital camera that is one example of the embodiment of an image-pickup apparatus of the present invention.

FIG. 1 is a perspective view seen from a front side of a digital camera that is one example of the embodiment of an image-pickup apparatus of the present invention. Reference numeral 1 denotes a digital camera that is the embodiment of the present invention. Reference numeral 2 denotes a lens barrel unit, reference numeral 3 denotes an exterior opening, reference numeral 4 denotes a strobe emission window that emits light as necessary when light intensity is insufficient for shooting, and they are arranged in the front side of the digital camera 1. Reference numeral 5 denotes a release button, reference numeral 6 denotes a zoom lever, and they are arranged in an upper side of the digital camera 1.

When an appropriate field angle is decided by the operation of the zoom lever 6, and taking a picture starts by the operation of the release button 5, an object image is taken into an image-pickup element as not shown in the figures through the lens barrel unit 2. The object image taken into the image-pickup element is processed to the image data with an arithmetic element as not shown in the figures, and the image date is written in a recording media. Moreover, the sound which is emitted from a speaker in the digital camera 1 is emitted from the exterior opening 3 which is placed in the almost same position with an opening described later.

Figure 2:
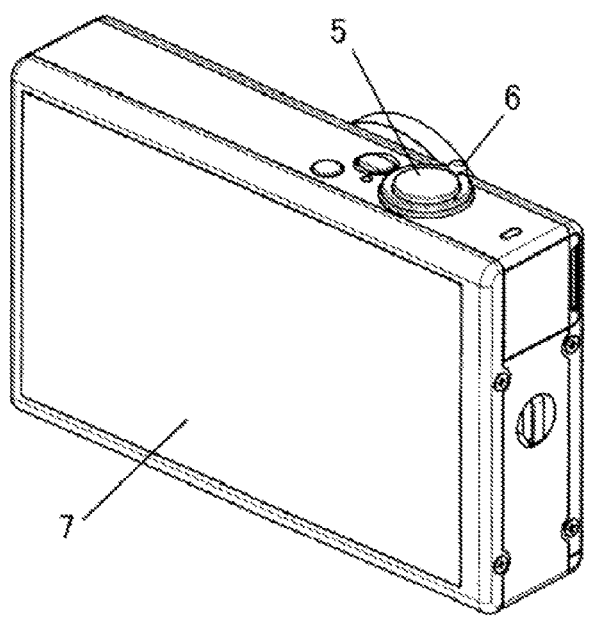
FIG. 2 is a perspective view seen from a back side of a digital camera.

FIG. 2 is a perspective view seen from a back side of the digital camera 1. Reference numeral 7 denotes a touch panel, and the contents displayed in a liquid display element as not shown in the figures under the touch panel 7 is operated and the sound is emitted from the exterior opening 3 according to contents of operations when user presses the touch panel 7.

Figure 3A:
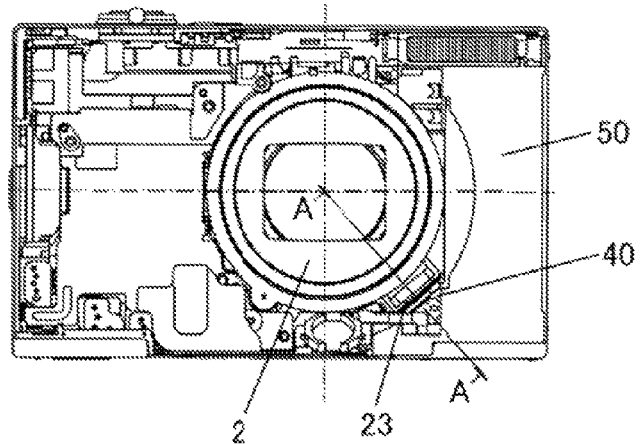
FIG. 3A is a front view in the state that an exterior cover of a digital camera is removed from the digital camera.
Figure 3B:
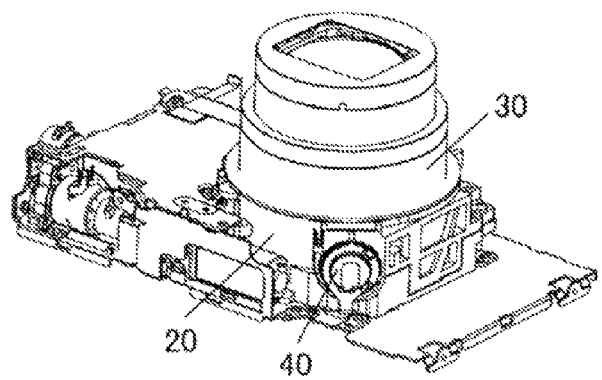
FIG. 3B is a bottom view in the state that the exterior cover of the digital camera is removed from the digital camera.
Figure 3C:
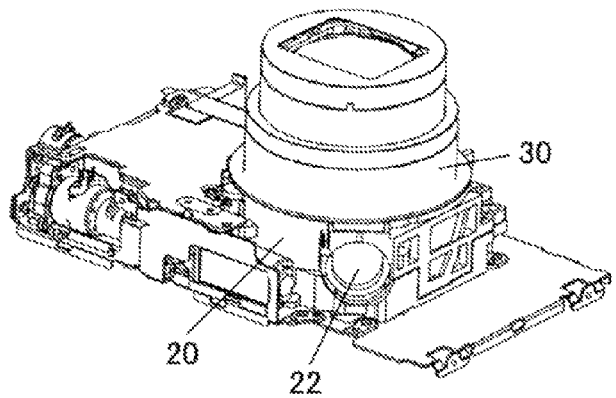
FIG. 3C is a figure in the state that a speaker is detached from the state shown in FIG. 3B.

FIG. 3A is a front view in the state that an exterior cover (an exterior part) of the digital camera 1 is removed from the digital camera 1. FIG. 3B is a perspective view in the state that a battery applied part 50 and a strobe unit are removed from the digital camera 1 from the state shown in FIG. 3A. FIG. 3C is a figure in the state that the speaker is detached from the state shown in FIG. 3B.

Reference numeral 20 denotes a fixed barrel, reference numeral 30 denotes a movable barrel, and they compose the lens barrel unit 2. Reference numeral 40 denotes a speaker, and reference numeral 50 denotes a battery applied part. The speaker 40 is arranged in a space between the lens barrel unit 2 and the battery applied part 50.

Reference numeral 22 denotes a sound space in an outer periphery of the fixed barrel, reference numeral 23 is an opening which connects to the sound space 22, and a front side of the speaker 40 is arranged so as to cover the sound space 22. The sound emitted from the speaker 40 utilizes the sound space 22 as an echo space, passes the opening 23, and is emitted from the exterior opening 3 which is placed in the almost same position with the opening 23 as previously explained toward the photographer side.

Figure 4:
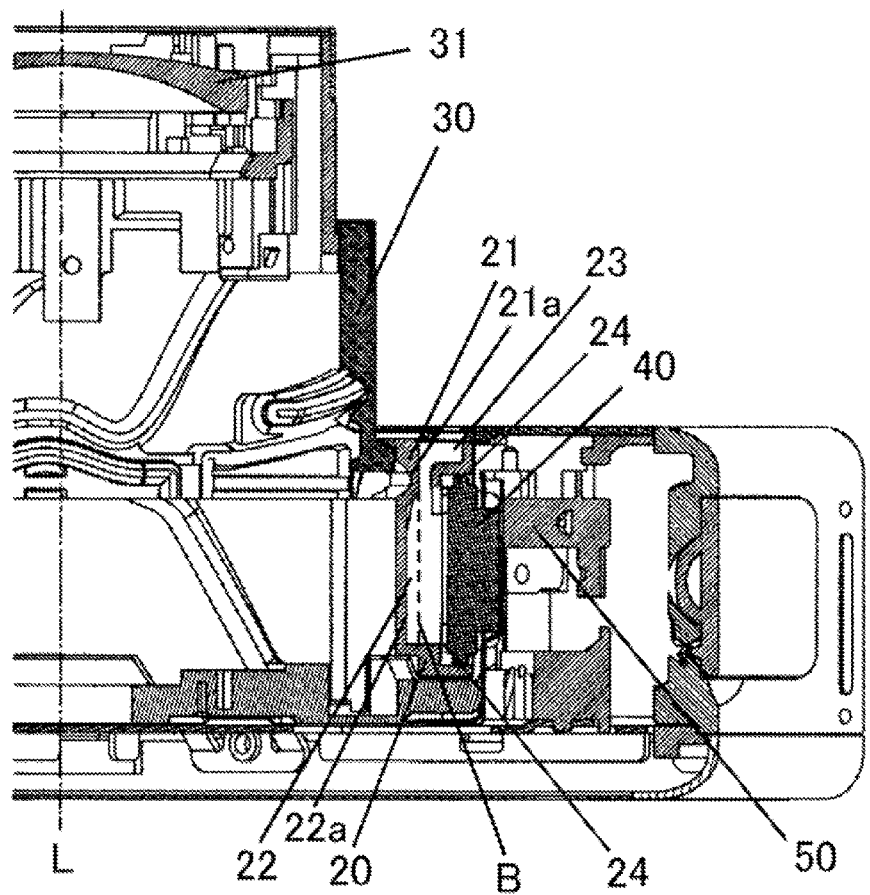
FIG. 4 is a cross-sectional view cut in the section A-A shown in FIG. 3A.

FIG. 4 is a cross-sectional view cut in the section A-A shown in FIG. 3A. A cam groove 21 is formed in an inner periphery of the fixed barrel 20 so as to drive the movable barrel 30, and a cam pin as not shown in the figures is formed in an outer periphery of the movable barrel 30. The cam pin engages with the cam groove 21 and traces the cam groove 21 so as to drive the movable barrel 30. Further, at least one lens 31 is attached to the movable barrel 30. The speaker 40 is arranged so that the front side of the speaker 40 faces to the sound space 22. A speaker packing 24 formed by an elastic member is arranged between circumference of the front side of the speaker 40 and the fixed barrel 20. When the battery applied part 50 pushes the back side of the speaker 40 in the direction toward the optical axis L of the lens 31, the speaker packing 24 is crushed and the space between the front side of the speaker 40 and the sound space 22 is sealed.

The area enclosed with the fixed barrel 20 and dotted line B in FIG. 4 is an area where boring to the fixed barrel 20 is processed so as to form a concave portion in the fixed barrel 20. The sound space 22 can increase without devoting an extra space by boring the fixed barrel 20. At this time, a bottom part 22a of the sound space 22 is located near the optical axis L of the lens 31 than a bottom part 21a of the cam groove 21 near the optical axis L of the lens 31. Therefore, the speaker 40 is arranged near the fixed barrel 20 for a volume of the area enclosed with the fixed barrel 20 and dotted line B. As a result, a frontal projected area can be decreased and the digital camera 1 can be more miniaturized.

In this embodiment, a bottom part 21a of the cam groove 21 and a bottom part 22a of the sound space 22 are not overlapped in a thickness direction of the fixed barrel 20(the direction perpendicular to the optical axis) so that the sound space 22 is formed on the back side of the area where the cam lift of the cam groove 21 becomes zero at the front side of the optical axis of the fixed barrel 20. As a result, the bottom part 22a of the sound space 22 can be closer to the optical axis L of the lens 31 than the bottom part 21a of the cam groove 21. A hole is opened in the sound space 22 by forming the cam groove 21, and the sound space 22 cannot operate if the bottom part 21a of the cam groove 21 and the bottom part 22a of the sound space 22 are arranged to overlap in the thickness direction of the fixed barrel 20 (the direction perpendicular to the optical axis).

Figure 5A:
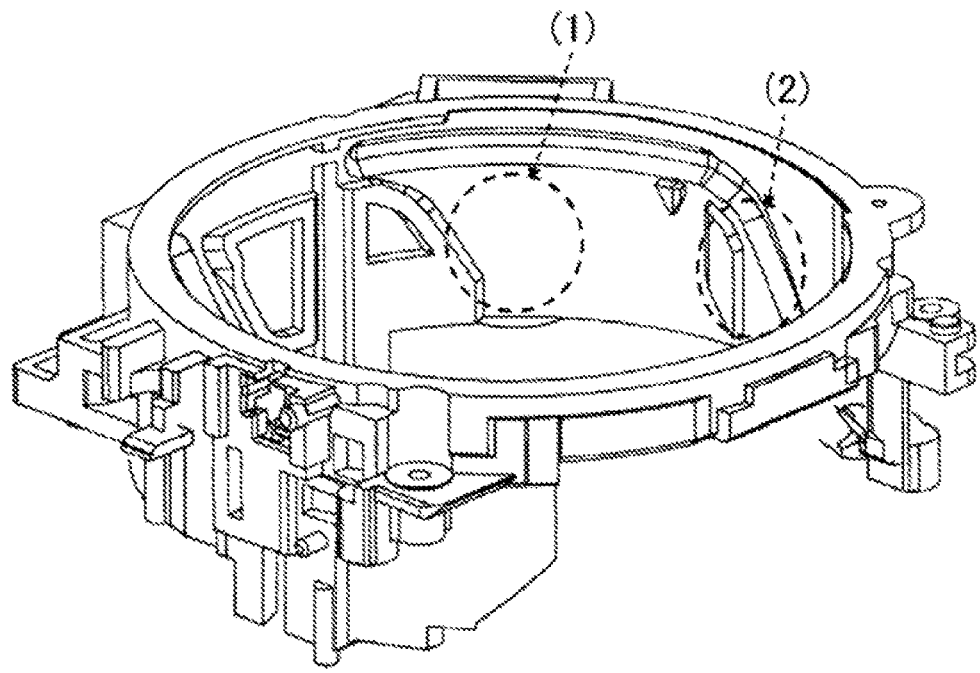
FIG. 5A is an external view of a fixed barrel of a digital camera.
Figure 5B:
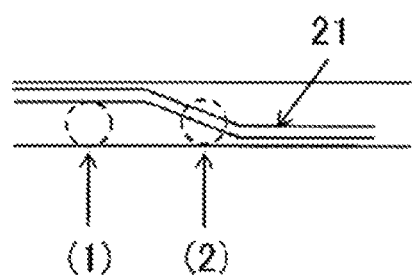
FIG. 5B is a pattern diagram of a development view of an inner periphery of the fixed barrel of the digital camera.

The above composition is described by using FIG. 5. FIG. 5A is an external view of the fixed barrel 20 of the digital camera 1, and FIG. 5B is a pattern diagram of a development view of the inner periphery of the fixed barrel 20 of the digital camera 1. In an area shown by (1) in FIGS. 5A and 5B (a first area), a lens barrier as not shown in the figures so as to protect the lens 31 set in the lens barrel unit 2 only opens and shuts even if rotational motion by the motor as not shown in the figures is transmitted to the movable barrel 30. That is, the movable barrel 30 only drives in the circumference direction of the optical axis and doesn't move to the optical axis direction. At this time, since the area shown by (1) occupies large percentages in total length of the cam, and the cam lift of the cam groove 21 is zero, the sound space 22 is widely formed in the fixed barrel 20. Therefore, the speaker of large diameter is arranged in a small frontal projected area, and a big sound space is able to secure so as to put out loud sound from the digital camera 1. On the other hand, in an area shown by (2) in FIGS. 5A and 5B (a second area), the movable barrel 30 rotates around the optical axis and moves with respect to the optical axis according to the track of the cam groove 21 when rotational motion by the motor transmits to the movable barrel 30. Distance between the image-pickup element as not shown in the figures and the lens 31 in the optical axis direction changes by the movement, and field angle can be changed. Moreover, it is difficult to widely form the sound space 22 in the cam groove 21 even if the sound space 22 is processed without penetrating since the cam groove 21 crosses the fixed barrel 20 diagonally in the area shown by (2). The area shown (1) is suited to form the sound space 22 than the area shown in (2) because large diameter of the speaker emits a better sound than small diameter of the speaker.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2011-284729, filed on Dec. 27, 2011, which is hereby incorporated by reference herein in its entirety.

What is claimed is:

1. An image-pickup apparatus comprising:
    a speaker;
    a movable barrel having a lens;
    a fixed barrel where a cam groove engaging with a cam pin provided on the movable barrel and configured to drive the movable barrel is formed on its inner periphery; and
    an exterior part where the fixed barrel is attachable,
    wherein a sound space is formed by concaving an outer periphery of the fixed barrel,
    wherein the speaker is arranged so as to cover the sound space,
    wherein an opening connected with the sound space is formed on the exterior part, and
    wherein a bottom part of the sound space is located closer to an optical axis of the lens than to the bottom part of the cam groove in the fixed barrel.

2. The image-pickup apparatus according to claim 1, wherein a first area where the movable barrel is not driven in an optical axis direction of the lens and a second area where the movable barrel is driven in the optical axis direction of the lens are formed in the cam groove, and
    wherein the sound space is formed on a back side of the first area.

3. The image-pickup apparatus according to claim 1, wherein a front side of the speaker is arranged so as to face the optical axis of the lens.

4. The image-pickup apparatus according to claim 1, wherein the opening is formed on an attachment surface to attach the fixed barrel in the exterior part.

5. The image-pickup apparatus according to claim 1, further comprising a battery applied part to attach a battery,
    wherein the speaker is arranged in a space between the battery applied part and the fixed barrel.

* * * * *